(12) United States Patent
Niessner et al.

(10) Patent No.: US 9,653,887 B1
(45) Date of Patent: May 16, 2017

(54) SPARK PLUG FOR A PRECHAMBER INTERNAL COMBUSTION ENGINE

(71) Applicant: Federal-Mogul Ignition GmbH, Neuhaus-Schierschnitz (DE)

(72) Inventors: Werner Niessner, Steinheim (DE); Alexander Schenk, Waiblingen (DE); Arian Mesdaghi, Cologne (DE)

(73) Assignee: Federal-Mogul Ignition GmbH, Wiesbaden (DE)

( * ) Notice: Subject to any disclaimer, the term of this patent is extended or adjusted under 35 U.S.C. 154(b) by 0 days.

(21) Appl. No.: 15/240,222

(22) Filed: Aug. 18, 2016

(51) Int. Cl.
| | | |
|---|---|---|
| *H01T 13/20* | (2006.01) | |
| *H01T 13/16* | (2006.01) | |
| *F02B 19/12* | (2006.01) | |
| *F02P 15/00* | (2006.01) | |
| *H01T 13/08* | (2006.01) | |
| *H01T 13/32* | (2006.01) | |

(52) U.S. Cl.
CPC .............. *H01T 13/16* (2013.01); *F02B 19/12* (2013.01); *F02P 15/001* (2013.01); *H01T 13/08* (2013.01); *H01T 13/32* (2013.01)

(58) Field of Classification Search
CPC .......... H01T 13/16; H01T 13/08; H01T 13/32
USPC ................................................. 313/139, 141
See application file for complete search history.

(56) References Cited

U.S. PATENT DOCUMENTS

| | | | |
|---|---|---|---|
| 5,408,961 | A | 4/1995 | Smith |
| 6,064,144 | A | 5/2000 | Knoll |
| 2006/0033411 | A1 | 2/2006 | Lindsay |
| 2009/0140623 | A1 | 6/2009 | Ugalde |

FOREIGN PATENT DOCUMENTS

| | | |
|---|---|---|
| DE | 19705372 C2 | 8/1998 |
| DE | 10326269 A1 | 1/2005 |
| EP | 2139082 A1 | 12/2009 |

OTHER PUBLICATIONS

A German Office Action for DE102015102745.3.

*Primary Examiner* — Vip Patel
(74) *Attorney, Agent, or Firm* — Reising Ethington, P.C.

(57) ABSTRACT

A spark plug for a prechamber internal combustion engine, having: a body with a passage and a front end; a center electrode located in the passage and that projects past the front end; an insulator that surrounds a section of the center electrode and has a tapering front end that together with the passage forms a free annular space within the body; a ground electrode with an annular ignition section that surrounds a section of the center electrode located outside the body, forming a spark gap; the ground electrode has a mounting section connected to the front end of the body, and at least two web sections connecting the ignition section to the mounting section; located between the web sections are scavenging ports through which the annular space is in connection with the environment outside the spark plug.

12 Claims, 4 Drawing Sheets

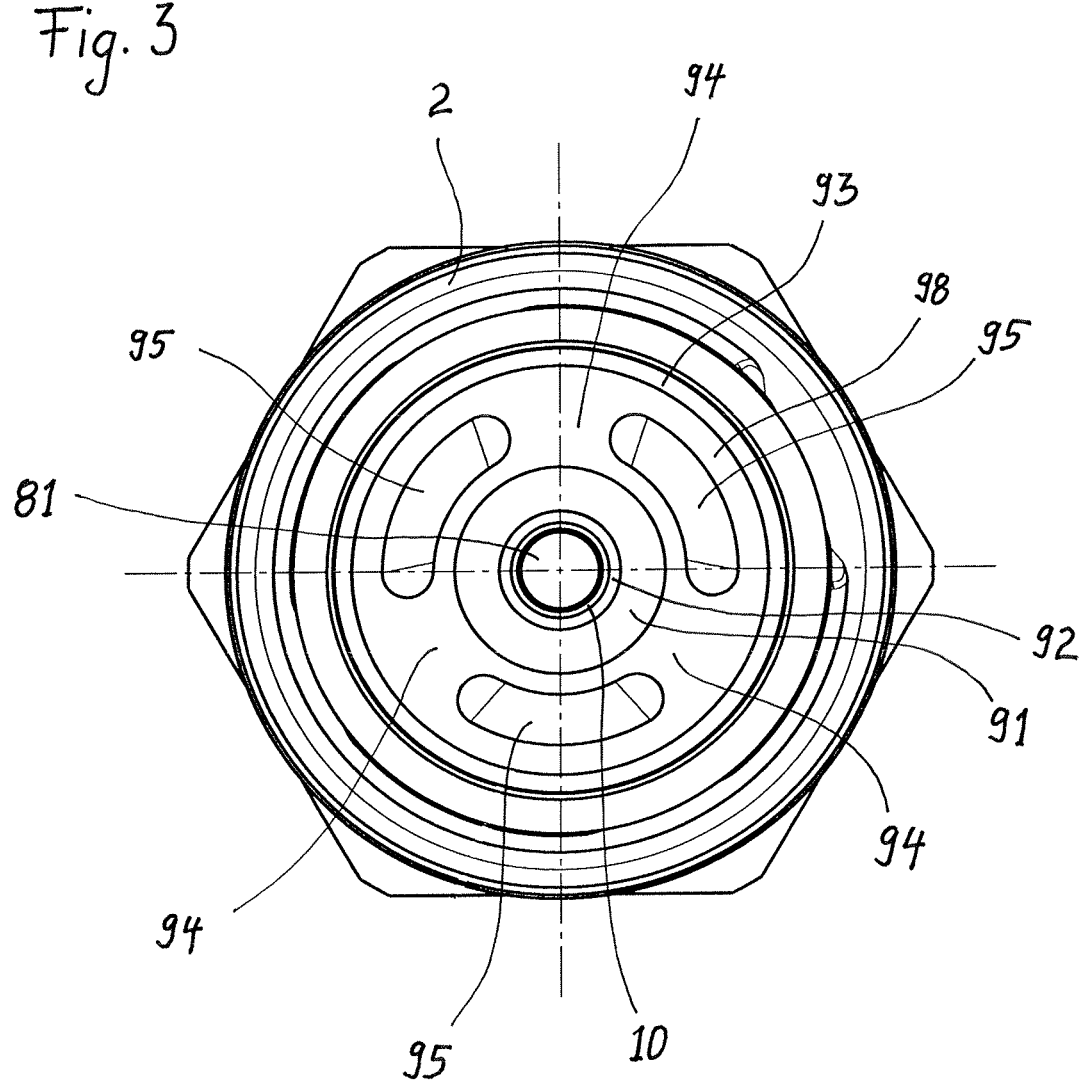

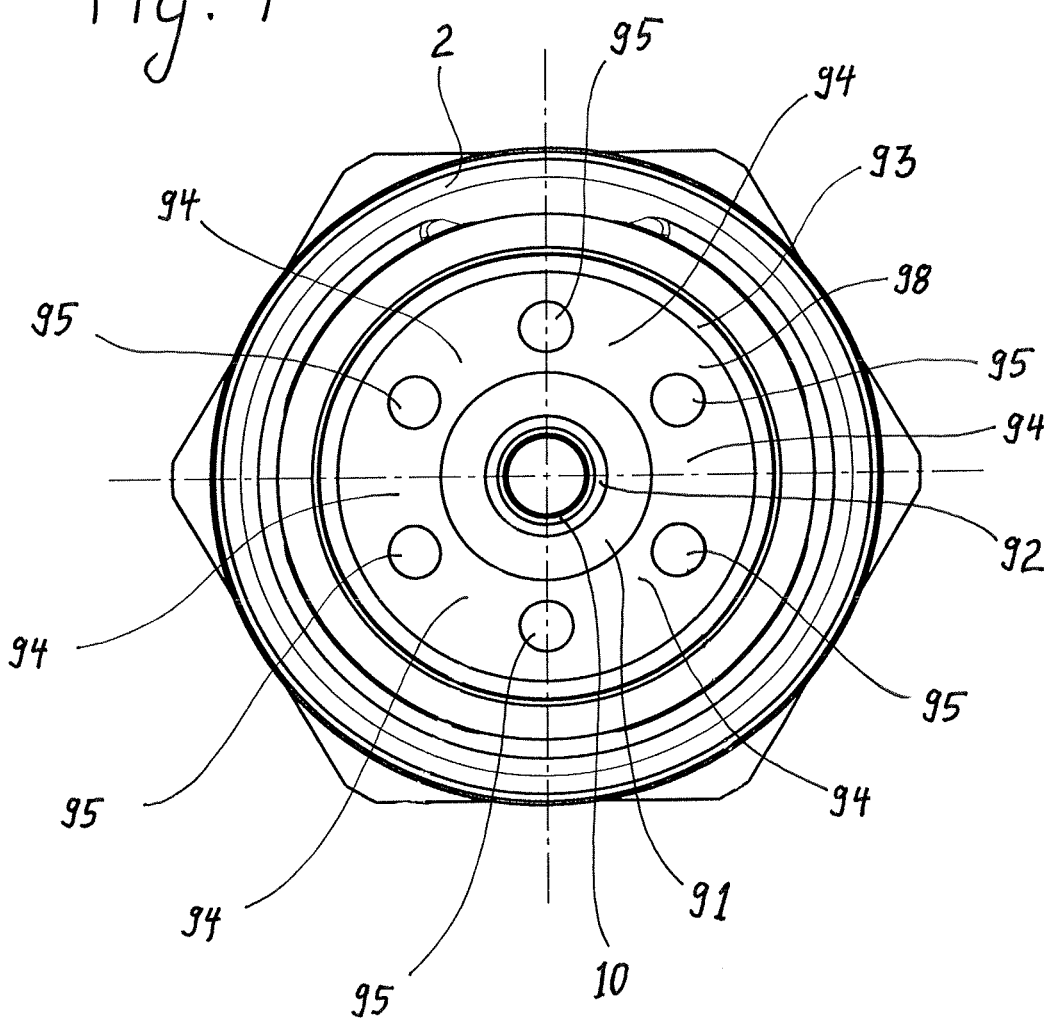

SPARK PLUG FOR A PRECHAMBER INTERNAL COMBUSTION ENGINE

FIELD

The invention generally relates to a spark plug for a prechamber internal combustion engine.

BACKGROUND

Spark plugs of this nature have long been known from DE 197 05 372 C2 and U.S. Pat. No. 5,408,961 A. Spark plugs of this type have also long been manufactured in quantity and used in stationary, gas-powered internal combustion engines in which each combustion chamber has a prechamber into which the front end of such a spark plug projects. The prior art spark plugs have relatively thin web sections at their ground electrodes with relatively large scavenging ports located between them, by means of which scavenging ports an annular space located in the body of the spark plug stands in connection with the environment outside the spark plug, and which scavenging ports permit good scavenging of the annular space and the spark gap with the combustion gas/fuel mixture flowing into the prechamber of the internal combustion engine when the spark plug is operated. Spark plugs of this type permit good and reliable ignition of the combustion gas/air mixture, even when this is a "lean mixture" in which the amount of air actually present is greater than the amount of air stoichiometrically required for complete combustion of the combustion gas.

SUMMARY

An object of the invention is to improve a spark plug of the initially mentioned type and to extend its service life.

The object may be attained by a spark plug with the features of claim 1. Advantageous enhancements are the subject matter of the dependent claims.

The spark plug according to one aspect has a body with a passage and a front end. Located in the passage of the body is a center electrode that projects past the front end of the body. Seated inside the passage of the body is an insulator that surrounds a section of the center electrode located within the body. In the region of the front end of the body, the insulator has a tapering front end that together with the passage forms a free annular space within the body. The center electrode is parallel to a center line of the spark plug. The annular space is arranged to be coaxial with the center line of the spark plug.

The spark plug has a ground electrode with an annular ignition section that surrounds a section of the center electrode located outside the body, forming a spark gap. The annular ignition section and the spark gap are arranged to be coaxial with the center line of the spark plug.

The ground electrode has at least one mounting section connected in an electrically conductive manner to the front end of the body and has at least two web sections connecting the ignition section to the mounting section. Located between the web sections of the ground electrode are scavenging ports through which the annular space located in the body stands in connection with the environment outside the spark plug, and which permit good scavenging of the annular space and the spark gap with the combustion gas/air mixture flowing into the prechamber of the internal combustion engine when the spark plug is operated. The open area of the scavenging ports located between the web sections of the ground electrode is at least 20% and at most 50%, in particular at least 25% and at most 35%, of the open area of the annular space at the front end of the body. The open area of the annular space is determined in an imaginary plane perpendicular to the center line of the spark plug at the front end of the spark plug.

The spark plug may have the following features:

The web sections and the ignition section of the ground electrode are enlarged. Surprisingly, it has been determined that because of the design the ignition performance of the spark plug is not degraded, but a substantially longer service life can be achieved for the spark plug. A lifetime of 6,000 operating hours may be achieved.

The increased width of the web sections is still small enough to avoid impermissible obstruction of the combustion gas/air mixture flowing through the scavenging ports into the annular space. A slight narrowing of the scavenging ports as a result of the enlarged web sections can therefore be tolerated.

An enlarged cross-section of the web sections and an enlarged surface of the ignition section of the ground electrode make it possible for the ground electrode to withstand longer the electrode consumption occurring during operation. The electrode consumption that occurs is distributed over larger cross-sections and larger areas, so the ignition geometry, in particular the width of the spark gap, changes only slightly over the period of use. The minimum size of the scavenging ports still ensures very good scavenging of the annular space and the spark gap with the combustion gas/air mixture when the spark plug is operated. The very good ignition performance, even with lean mixtures, is not impaired.

The spark plug represents an especially good compromise between the conflicting requirements of, on the one hand, providing the largest and most stable web sections possible to achieve long service life, and on the other hand providing minimum hindrance to the flow of the combustion gas/air mixture with the largest possible scavenging ports.

The ground electrode provides improved heat transport from the ignition section to the body, in particular through the enlarged cross-sections of the web sections. The temperatures arising at the ground electrode can be reduced to values around 600° C., for example, so no thermal damage is to be expected.

DE 103 26 269 A1, in which a spark plug for prechamber ignition is disclosed, proposes to provide a spark plug that projects into the prechamber of the combustion chamber with an auxiliary prechamber. The auxiliary prechamber is intended to be composed of an annular space, called a "vent chamber," between the body and the insulator, by the means that a cover is placed on the front end of the body, thereby closing the vent chamber. Ignition is intended to be initiated by an ignition spark in the transition region between the prechamber and the auxiliary prechamber, wherein the cover is intended to serve as the ground electrode at the same time. Consequently, scavenging of the annular space is not desired in this embodiment, even though the cover can have one or more small holes. Such an approach has not proven itself in practice, and consequently has not found its way into mass production of spark plugs.

In an embodiment, the scavenging ports are formed by bores or elongated holes in the ground electrode. The elongated holes can be curved around the center line of the spark plug in a kidney shape. In longitudinal cross-section through the spark plug, the center line of each of the scavenging ports can have an angle of 30° to 60°, in particular 45°, to the center line of the spark plug. This further improves the scavenging of the annular space and the spark gap.

In an embodiment, the ground electrode can have a region on its inner side facing the annular space that tapers conically in a direction along the center electrode toward the spark gap. This region can improve the flow of the combustion gas/air mixture in the annular space. In another embodiment, the center electrode can have a region on its outside facing away from the annular space that tapers conically in a direction along the center electrode toward the spark gap. With the conical region on the outside of the ground electrode, it is possible to achieve a small size of the surface of the ground electrode that absorbs the process heat of the engine. The cone angle of the conical region on the inside—with reference to the center line of the spark plug—can be smaller than the cone angle of the conical region on the outside. This can further improve heat transport to the body. The web sections and the scavenging ports located between them can be located in the conical region of the outside of the ground electrode.

In another embodiment, the mounting section of the annular electrode can be annular in shape and stand in contact with the front end of the body around its entire circumference. In particular, the annular mounting section of the ground electrode can be welded to the front end of the body around its entire circumference in order to ensure good heat transport from the ground electrode to the body.

In an embodiment, the insulator can end inside the body so that the annular space is formed at the front end of the body by the passage and the center electrode. In this design, the front end of the insulator is located inside the body. The ignition section of the ground electrode and/or the center electrode can contain a precious metal reinforcement that borders the spark gap in each case. In the case of the surface of the center electrode that is subject to consumption during operation, its outer circumferential surface is used, which can be provided with a cylindrical precious metal piece in this region. A tubular or sleeve-shaped precious metal piece can be located in the annular ignition section of the ground electrode. The diameter of the center electrode can be between 2.5 mm and 4 mm. The annular spark gap can have a height of from 1.6 mm to 4 mm measured parallel to the center line of the spark plug. This makes it possible to achieve large electrode consumption areas, in particular in the range from 12 $mm^2$ to 20 $mm^2$, and to ensure especially long service life for the spark plug. Platinum and iridium, in particular, as well as their alloys, are suitable as materials for the precious metal reinforcements. An oxidation-resistant nickel-based alloy is suitable as the material for the ground electrode.

Preferred exemplary embodiments of the invention will hereinafter be described in conjunction with the appended drawings, wherein like designations denote like elements, and wherein:

FIG. 3 shows a top view of the front end of the spark plug from FIG. 2; and

FIG. 4 shows a top view similar to that in FIG. 3 of the front end of another variant.

DESCRIPTION

Figure 1:
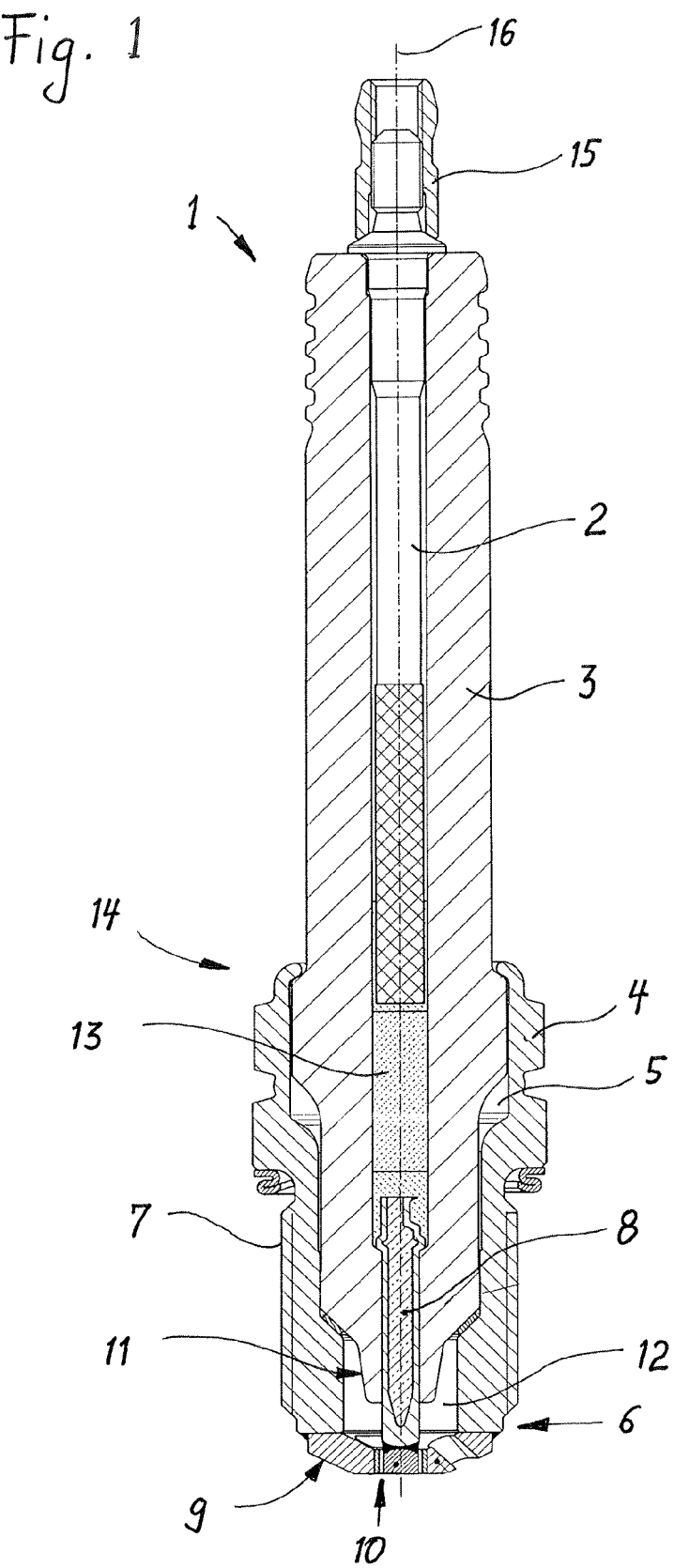
FIG. 1 shows a spark plug according to an embodiment of the invention in longitudinal section.

The spark plug 1 shown in FIG. 1 contains a center conductor 2 that is surrounded by an insulator 3. The spark plug 1 has a body 4 with a passage 5 that accommodates the insulator 3. The body 4 has a front end 6, and is equipped on its external surface with a thread 7 originating from the front end 6, by means of which the spark plug 1 can be screwed into an internal combustion engine—not shown—so that the front end 6 projects into a prechamber of the internal combustion engine. The spark plug 1 contains a center electrode 8 and a ground electrode 9, which form an annular spark gap 10.

The center electrode 8 is located in a passage of the insulator, and projects past the front end 6 of the body 4. The insulator 3 seated in the passage 5 has a tapering front end 11 that surrounds a section of the center electrode 8 located inside the body 4, and together with the passage 5 forms an open annular space 12, which is also called a "vent chamber." The center electrode 8 is connected to the center conductor 2 in an electrically conductive manner by a fused glass element 13. The insulator 3 projects out of the back end 14 of the body 4. Located at the back end of the insulator 3 is a high-voltage terminal 15 that is connected to the center conductor 2 in an electrically conductive manner.

Figure 2:
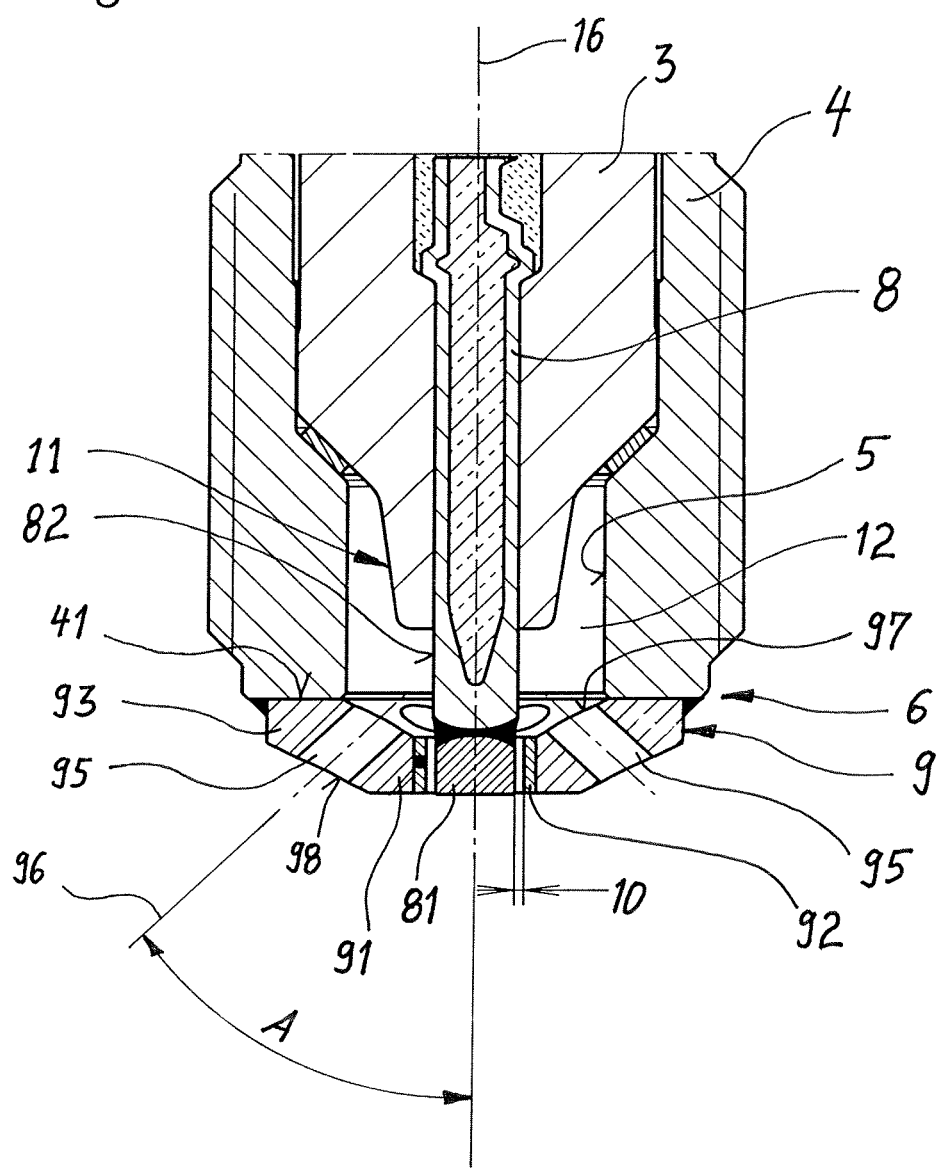
FIG. 2 shows an enlarged view of the spark plug from FIG. 1 in the region of its front end.

The rest of the embodiment is explained with the aid of the enlarged representations in FIGS. 2 and 3. The center electrode 8 projects past the front end 6 of the body 4, namely, its flat face 41. The section projecting past the face 41 contains a precious metal reinforcement 81. The section of the center electrode 8 containing the reinforcement 81 thus lies outside the body 4. The ground electrode 9 has an annular ignition section 91 that surrounds the section 81 of the center electrode 8 at a distance and forms the spark gap 10 together therewith. The ignition section 91 contains an annular precious metal reinforcement 92. The ground electrode 9 has an annular mounting section 93 that is welded to the front end 6 along the entire circumference of the body 4. The mounting section 93 stands in contact with a flat face 41 of the body 4. The ground electrode 9 has three web sections 94 that connect the mounting section 93 to the ignition section 91. Located in the ground electrode 9 between the web sections 94 are three scavenging ports 95 through which the annular space 12 stands in connection with the environment outside the spark plug 1. The scavenging ports 95 permit good scavenging of the annular space 12 and the spark gap 10 with the combustion gas/fuel mixture flowing into the prechamber of the internal combustion engine when the spark plug 1 is operated. In longitudinal cross-section in FIG. 2, the center line 96 of the scavenging port 95 forms an angle A of approximately 45° to the center line 16 of the spark plug 1.

The ground electrode 9 has a region 97 on its inner side facing the annular space 12 that tapers conically along the center electrode 8 toward the spark gap 10. The ground electrode 9 has a region 98 on its outside facing away from the annular space 12 that tapers conically in the same direction. The web sections 94 and the scavenging ports 95 located between them are located in the conical region 98.

The insulator 3 ends with its front end 11 inside the body 4, so the annular space 12 is formed at the front end 6 by the passage 5 and the center electrode 8. The section 82 of the center electrode 8 that lies between the front end 11 of the insulator 3 and the face 41 of the body thus directly delimits the annular space 12.

The scavenging ports 95 can be implemented as elongated holes curved in a kidney shape, as is evident in FIG. 3. However, the scavenging ports 95 can also take other shapes, and can be implemented as cylindrical bores as shown in FIG. 4, for example. Apart from the shape of the scavenging ports 95, the spark plug 1 in FIG. 4 is identical in design to the spark plug 1 shown in FIGS. 1 to 3.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 1 spark plug
2 center conductor
3 insulator
4 body
5 passage
6 front end
7 thread
8 center electrode
9 ground electrode
10 spark gap
11 front end
12 annular space
13 fused glass element
14 back end
15 high-voltage terminal
16 center line
41 face
81 precious metal reinforcement
82 section
91 ignition section
92 precious metal reinforcement
93 mounting section
94 web sections
95 scavenging ports
96 center line
97 conical region
98 conical region
A angle

The invention claimed is:

1. A spark plug for a prechamber internal combustion engine, comprising:
a body with a passage and a front end;
a center electrode that is located in the passage of the body and that projects past the front end of the body;
seated inside the passage of the body, an insulator that surrounds a section of the center electrode located within the body, and has a tapering front end that together with the passage forms a free annular space within the body;
a ground electrode with an annular ignition section that surrounds a section of the center electrode located outside the body, forming a spark gap;
the ground electrode has at least one mounting section connected in an electrically conductive manner to the front end of the body and has at least two web sections connecting the ignition section to the mounting section;
located between the web sections of the ground electrode are scavenging ports through which the annular space located in the body stands in connection with the environment outside the spark plug, and which permit good scavenging of the annular space and the spark gap with the combustion gas/air mixture flowing into the prechamber of the internal combustion engine when the spark plug is operated;
wherein an open area of the scavenging ports of the ground electrode is at least 20% and at most 50% of an open area of the annular space at the front end of the body.

2. The spark plug according to claim 1, in which the open area of the scavenging ports is at least 25% and at most 35% of the open area of the annular space.

3. The spark plug according to claim 1, in which the mounting section of the ground electrode is annular in shape and stands in contact with the front end of the body around its entire circumference.

4. The spark plug according to claim 3, in which the annular mounting section of the ground electrode is welded to the front end of the body around its entire circumference.

5. The spark plug according to claim1, in which the scavenging ports are formed by bores or elongated holes in the ground electrode.

6. The spark plug according to claim 5, in which the elongated holes are curved in a kidney shape.

7. The spark plug according to claim 1, in which the ground electrode has, on its inner side facing the annular space, a region that tapers conically in a direction along the center electrode toward the spark gap.

8. The spark plug according to claim 1, in which the ground electrode has, on its outside facing away from the annular space, a region that tapers conically in a direction along the center electrode toward the spark gap.

9. The spark plug according to claim 8, in which the web sections and the scavenging ports located between them are located in the conical region of the outside of the ground electrode.

10. The spark plug according to claim 1, in which, in longitudinal cross-section through the spark plug, a center line of each of the scavenging ports has an angle of 30° to 60°, to a center line of the spark plug.

11. The spark plug according to claim 1, in which the insulator ends inside the body so that the annular space is formed at the front end of the body by the passage and the center electrode.

12. The spark plug according to claim 1, in which the ignition section of the ground electrode and/or the center electrode contains a precious metal reinforcement that borders the spark gap.

* * * * *

UNITED STATES PATENT AND TRADEMARK OFFICE
CERTIFICATE OF CORRECTION

| | |
|---|---|
| PATENT NO. | : 9,653,887 B1 |
| APPLICATION NO. | : 15/240222 |
| DATED | : May 16, 2017 |
| INVENTOR(S) | : Werner Niessner et al. |

Page 1 of 1

It is certified that error appears in the above-identified patent and that said Letters Patent is hereby corrected as shown below:

In the Claims

Claim 5, Column 6, Line 34, include a space between "claim" and "1"

Signed and Sealed this
Fifteenth Day of May, 2018

Andrei Iancu
*Director of the United States Patent and Trademark Office*